United States Patent [19]

Haag et al.

[11] Patent Number: 4,634,806

[45] Date of Patent: Jan. 6, 1987

[54] HIGH-VOLTAGE INSULATOR

[75] Inventors: Gottlob Haag, Markgröningen; Karl-Heinz Hägele, Vaihingen; Helmut Härer, Remseck, all of Fed. Rep. of Germany

[73] Assignee: Robert Bosch GmbH, Stuttgart, Fed. Rep. of Germany

[21] Appl. No.: 675,046

[22] Filed: Nov. 26, 1984

[30] Foreign Application Priority Data

Feb. 11, 1984 [DE] Fed. Rep. of Germany ....... 3404987

[51] Int. Cl.$^4$ ...................... H01B 17/56; H01B 17/50
[52] U.S. Cl. ...................................... 174/211; 55/146; 174/212
[58] Field of Search ................... 174/211, 212; 55/146; 313/143

[56] References Cited

U.S. PATENT DOCUMENTS

| 1,216,139 | 2/1917 | Kopf | 174/212 X |
| 2,063,391 | 12/1936 | Malick | 55/146 |
| 2,353,620 | 7/1944 | Weinerth | 313/143 X |
| 2,526,715 | 10/1950 | Viets | 55/146 X |
| 3,829,629 | 8/1974 | Nitta | 174/211 X |

FOREIGN PATENT DOCUMENTS

| 13018 | 5/1934 | Australia | 55/146 |
| 260323 | 2/1968 | Australia | 174/211 |
| 1088142 | 9/1954 | France | 174/211 |
| 1462574 | 11/1966 | France | 174/211 |
| 166520 | 10/1922 | United Kingdom | 313/143 |
| 214170 | 4/1924 | United Kingdom | 174/212 |
| 747131 | 3/1956 | United Kingdom | 174/212 |

Primary Examiner—Laramie E. Askin
Attorney, Agent, or Firm—Edwin E. Greigg

[57] ABSTRACT

A high-voltage insulator which is suitable for use in chambers carrying gas highly charged with solid particles and is used particularly in electrostatic filters used for cleaning an exhaust gas derived from internal combustion engines used to drive motor vehicles. The high-voltage insulator is columnar in structure, having shield-like ribs succeeding one another at intervals, adjacent to each of which in the insulator is one recess. With the remaining insulator parts having a smaller diameter, this recess forms a sharp edge, which defines discharge paths toward the flank of the shield-like ribs. Inside these paths, the insulator is kept free of soot coatings or conductive coatings, so that the insulator itself offers high resistance to leakage currents, which would cause insupportable power losses.

3 Claims, 4 Drawing Figures

HIGH-VOLTAGE INSULATOR

BACKGROUND OF THE INVENTION

The invention is based on a high-voltage insulator for installation in chambers carrying a gas highly charged with solid particles, especially chambers carrying an exhaust gas deriving from internal combustion engines. A high-voltage insulator of this kind is known, for instance from U.S. Pat. No. 2,565,458, and is used there in an electrostatic filter by means of which small foreign particles such as dust are to be removed from gases similar to air. These particular high-voltage insulators used are basically columnar in structure, with annularly extending ribs, and they serve to retain the precipitator plates, which are exposed to high voltage, in the interior of the housing. Such insulators, because of the manner in which they are used, are exposed to dirty gas and can easily become covered with a layer of dirt. The threshold for igniting partial discharges on the surface is lowered to a greater or lesser extent, depending on the composition of this layer of dirt. Leakage currents, causing permanent power losses on the part of the electric supply device for the electrostatic filter, flow via a conductive layer of foreign material. Such filters are also used for filtering out foreign bodies such as soot from the exhaust gases of internal combustion engines. Especially in self-igniting engines, the exhaust gases often contain a rather large amount of very finely dispersed soot. This soot quite quickly forms a continuous layer of uniform thickness on the insulators exposed to the exhaust gas atmosphere, and it has the property of being a relatively good conductor of electricity. Electric shunting via the insulators thus usually occurs very quickly, and this puts a considerable load on the means used for supplying high voltage to the electrostatic filter. Especially when electrostatic filters are used for internal combustion engines in motor vehicles, the high-voltage system for supplying voltage to the filter should be capable of operating for long periods virtually without shunting, if possible, and with the smallest possible losses of high-voltage power. The power loss or operating output of the electrostatic filter represents a reduction of the power provided to the vehicle by the engine. Excessively high power loss via the insulators would accordingly cause an undesirable increase in fuel consumption during vehicle operation.

While the partial discharge occurring via a continuous layer of dirt on the insulator surface is not extremely disadvantageous in motor vehicle high-voltage systems, under some circumstances the power losses caused by leakage currents may cause the total failure of the high-voltage system, if the power losses are on the order of magnitude of the total high-voltage power that is available. The partial discharges normally occur only briefly, because the voltage surges that then occur, which are dictated by the limited capacity of the vehicle high-voltage system, disrupt the discharges once again.

Accordingly, where an electrostatic filter is used to remove soot from Diesel exhaust gases, the known insulators discussed at the outset above would rapidly destroy the functional capacity of the high-voltage supply system, because a conductive soot burning layer that is several millimeters thick can form on the insulators after only a few hours of operation.

Another electrostatic filter for cleaning internal combustion engine exhaust gases is known from British Pat. No. 1,022,714, in which the problem of soot contamination of the insulator that supports the electrodes is supposedly solved, but in a rather complicated manner. In the soot filtering device known from this patent, axial electrodes are provided inside a tube carrying an exhaust gas, and each of the electrodes is retained at the ends of this tube by two insulator parts. One of these insulator parts is bell-shaped and joined to the housing of the scrubbing system, while the other insulator part is disc-shaped and porous. A chamber which is exposed to compressed air through the electrode inlet is enclosed between the disc-shaped insulator part and the bell-shaped insulator part. The disc-shaped insulator part is immediately adjacent to the soot-charged atmosphere in the interior of the apparatus and is supposed to be kept free of soot by having the compressed air blown through its pores into the interior of the apparatus. This apparatus is rather complicated, and furthermore this design results in rather large structural sizes, because the second insulator part for voltage insulation of a magnitude of for instance 20 kV must necessarily have a large diameter.

OBJECT AND SUMMARY OF THE INVENTION

The high-voltage insulator according to the invention has the advantage over the prior art that in the long run it enables maintenance-free and shunt-free operation of a high-voltage system in the exhaust gas system of an internal combustion engine. By means of the embodiment of the high-voltage insulator, a suitable mechanism for a sort of self-cleaning of the insulator surface is furnished. Additional devices for cleaning the insulator surface can be dispensed with. Only small power losses are required in order to maintain the insulating capacity of the insulator, by effecting a burn-off of the soot at intervals. This power loss is converted directly into heat energy for burning off the soot, and the self-regulating character of the self-cleaning mechanism reduces the power loss to a minimum.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
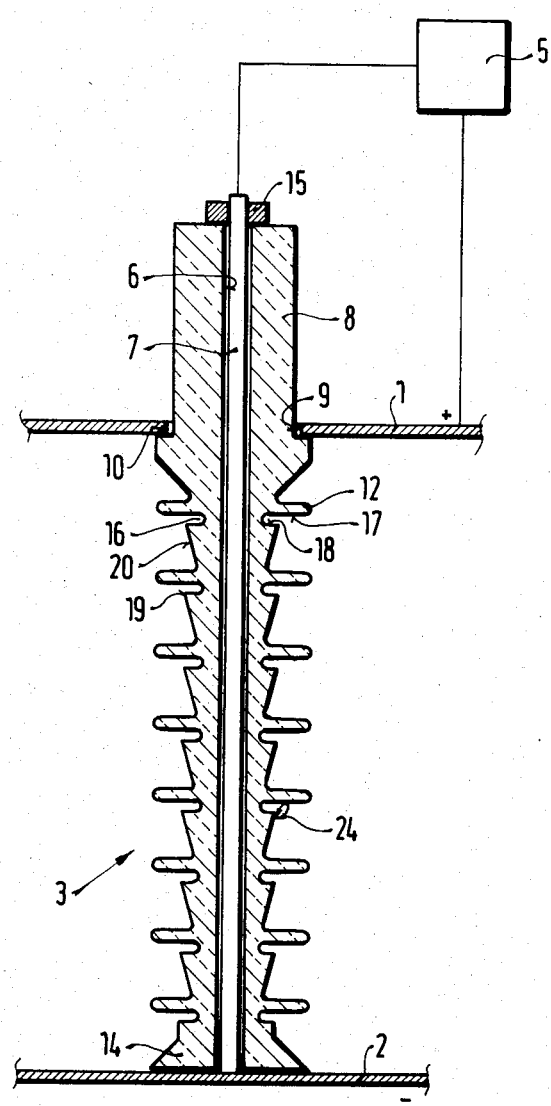
FIG. 1 is a longitudinal sectional view taken through a first exemplary embodiment of a high-voltage insulator having a coaxially inserted electrode.

In FIG. 1, a high-voltage insulator is shown in section, which mechanically joins a positive-polarity housing wall 1 of an electrostatic filter (not otherwise shown) or other high-voltage-carrying apparatus in motor vehicles with a negative-polarity electrode 2. In the area between the housing wall 1 and the electrode 2, the insulator 3 extends in columnar form and is exposed for instance to a soot-charged exhaust gas from internal combustion engines. To effect the polarity of the electrode 2, a high-voltage supply source 5 is incorporated between the housing 1 and the electrode 2. The high-voltage insulator may, as shown in FIG. 1, have an axial bore 6 through which a metallic conductor 7 is passed, which is connected at one end to the electrode 2 and at the other end extends out of the insulator 3 and is connected to the high-voltage source 5. The electrode 2 is thereby connected via the metallic conductor 7 to the negative pole of the high-voltage source 5, while the housing 1 is connected to the positive pole.

The insulator 3 has a cylindrical part 8, which protrudes to the outside through an opening 9 in the wall of the housing 1 and in the direction toward the interior of the housing merges with a shoulder 10, at which point it comes to rest on the housing. By suitable means, not shown here, the insulator can be joined firmly to the housing at this shoulder.

In the interior of the housing, in the part carrying the exhaust gas, the insulator has annular ribs 12, which extend radially and equidistantly from the bore 6 and at regularly spaced intervals from one another over the length of the insulator, i.e. from substantially one end to the other end thereof. On the end toward the electrode, the insulator merges with a supporting base 14, which may serve to connect the electrode to the insulator. In the present example, this connection is effected via the axial metallic conductor 7, which is fastened in the insulator with a check nut 15 at the outermost end of the circular cylindrical part 8.

The annular ribs 12 are the equivalent of discs or shields which protrude far beyond the basic body and are lined up on the insulator with spacer pieces of smaller diameter. Immediately adjacent to each rib, the insulator has an annular recess 16, one limiting wall of which is the flank 17 of the annular rib 12 and the other limiting wall 18 of which terminates in a sharp annular edge 19. This edge is considerably recessed radially in comparison with the outer diameter of the annular rib 12. The adjoining insulator part 20 between the recess 16 and upper surface of adjacent annular rib 12 also tapers conically in the direction toward the electrode 2 or toward the next rib 12 in sequence, such that the smaller diameter of the insulator at the transition to the next rib is approximately equal to the diameter of the insulator at the recess 16. The above-described portion is repeated substantially eight times, in the illustrated exemplary embodiment, over the entire length of the insulator located in the exhaust gas system.

The insulator shown is conceived such that especially the power losses caused by leakage currents are kept as low as possible by a sort of self-cleaning of the insulator surface. In exhaust gases highly charged with soot, the insulator surface rapidly becomes uniformly coated with a layer of soot, which may contain other foreign substances as well. In the case of a system which is in operation, that is, when a high voltage of ca. 20 kV is applied between the housing 1 and the electrode 2, this coating of soot is interrupted in the vicinity of the recesses 16. This interruption occurs because leakage currents flow in the coating when voltage is applied. Even if these leakage currents are very slight, intense electrical fields of for instance $E=10$ kV/cm are generated between the edge 19 and the flank 17 of the shield-like ribs 12, and these fields are sufficiently large that they are capable of repeatedly igniting partial surface discharges, such as corona or arc discharges, at this location. The high potential differences between the edge 19 and the flank 17 that are needed to accomplish this are produced by means of locally elevated coating resistances in the vicinity of the surface of the recesses. The cause for these elevated resistances is, first, the locally tapered diameter of the insulator at this point; but secondly, the thickness of the coating in the area of the recesses is also less, because the electrical fields E basically also shield the surface of the recess from a heavy deposition of coating particles. Soot particles flying toward it are separated out by the field forces, either onto the insulator parts 20 or on the more outwardly extending surfaces of the ribs 12 which function in the manner of shields, before they can reach the surface in the vicinity of the recess 16.

The soot deposited on the surface in the vicinity of the recesses despite the shielding provided by the electrical field is burned off with particularly great effectiveness by the ignited partial surface discharges. Small means total power losses of a few watts, for instance 5 watts, are sufficient to heat up the soot locally to temperatures on the order of magnitude of 1000° C. The first reason for this is that in the vicinity of the recesses, because of the high voltage consumption of the burning partial surface discharge, a locally highly concentrated conversion of all the power drawn at the insulator takes place. Furthermore, the conversion of electrical energy into heat energy takes place substantially inside the coating itself. Heat leakage currents caused by heat dissipation and heat transfer, such as would occur if the soot layer were externally heated, are thus avoided for the most part.

Corona and arc discharges contribute to the burn-off of the soot by different mechanisms. Fine coatings of soot having a thickness d of less than 0.5 mm are removed completely and virtually loss-free with a power of $p=1$ watt by means of a continuously burning corona discharge. During the corona discharge, the insulator surface is cleaned off completely by being bombarded by the ions accelerated in the corona discharge. Contrarily, thicker soot deposits having a layer thickness of more than 0.5 mm, which may form when the soot incidence is relatively great, are burned off by the high heat development of approximately 3500° K. in the base point toward the cathode end of an arc discharge from the edge 19 to the flank 17.

Figure 2:
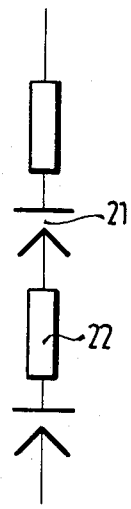
FIG. 2 is a substitute circuit diagram for a portion of the high-voltage insulator.

For stable operation of the insulator, sufficient resistance to surface conduction breakdown on the part of the insulator is also necessary. Although this resistance does increase with the number of soot burnoff points, that is, the recesses 16, it is also necessary, on the other hand, for remaining areas of the insulator surface, between the burnoff locations, to remain covered with layers of soot that are as thin as possible and are distributed as uniformly as possible. The soiled insulator surface is then comparable in a substitute sense with a series circuit of gas discharge segments 21, in the vicinity of the recesses 16, and ohmic resistors 22, in the vicinity of the remaining surfaces, that is, the insulator part 20 and the surface of the ribs 12 as far as the base point of the partial surface discharge. This substitute circuit diagram is shown in FIG. 2. If locally defined surface discharges are ignited, then the intermediate soot coatings act as current-stabilizing compensating resistors. If the ohmic resistance of these coatings is not sufficiently great, then because of the dropping current/voltage characteristic of discharges, the result would be a progressive increase in the current after the surface discharges are ignited. The inevitable result would be a progressive advancement of the partial discharge on the insulator surface and hence a foreign-layer sparkover or surface conduction breakdown.

By means of the shield-like annular ribs 12, a maximal creep length is attainable for a given insulator length if the ratio between the outer diameter of the ribs and the diameter of the insulator part 20 is dimensioned correctly. Furthermore, the diameters of the stem or stalk parts, that is, the intermediate insulator parts 20, should be selected as small as possible, and the thickness of the soot layers should remain as small as possible. The latter feature is promoted if the insulator is disposed in exhaust gas flows having a high flow speed, because the flow forces then hinder the formation of overly thick coatings. The length of the insulator is selected according to these parameters and is dimensioned such that sparkovers or surface conduction breakdowns occur as seldom as possible at a given operating voltage.

The insulator may be variously embodied while having fundamentally the same mode of operation. For instance, unlike the conically embodied insulator parts 20 shown in FIG. 1, in the embodiment of FIG. 3 the form of the intermediate insulator parts 20′ of insulator 3′ is cylindrical, although the conical embodiment has the advantage that the surface then extends virtually parallel to the field lines of the electrical field forming in the area of the direct-current insulator. The discharges 24 in FIG. 1 are then applied quite well to the soot layer on the insulator part. Short circuiting caused by arcs which have left the surface of the insulator parts and burn from rib to rib by thermal impetus is thus greatly impeded. Furthermore, the cleaning effect of the discharges is optimized.

The orientation of the edges 19 with respect to the flanks 17 of the shield-like ribs 12 has the advantage that a concentration of the field already takes place because of the sharp transition in diameter from the diameter at the edge 19 to the outer diameter of the rib 12 and thus, as already explained, this area of the insulator is shielded from the incident soot. This effect is further improved by the possible discharge in the vicinity of the recess.

Figure 3:
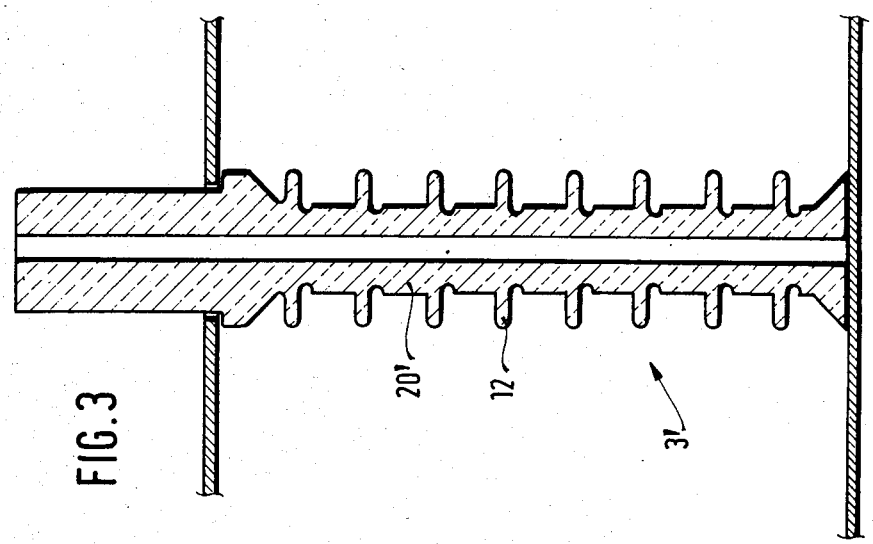
FIG. 3 is a longitudinal sectional view of a second exemplary embodiment of a high-voltage insulator.

In the exemplary embodiments according to FIGS. 1 and 3, recesses may also be provided on both sides of the shields 12; however, this considerably decreases the remaining resistance length of the soot-coated insulator parts 20 or 20′. If discharges take place at the recesses on both sides of the shields, then there is an increased tendency for the discharge or the burn-off to progress on the insulator part 20 and cause a sparkover from one shield to another, which must however be avoided, because as already explained this leads to a complete failure of the high-voltage system.

Figure 4:
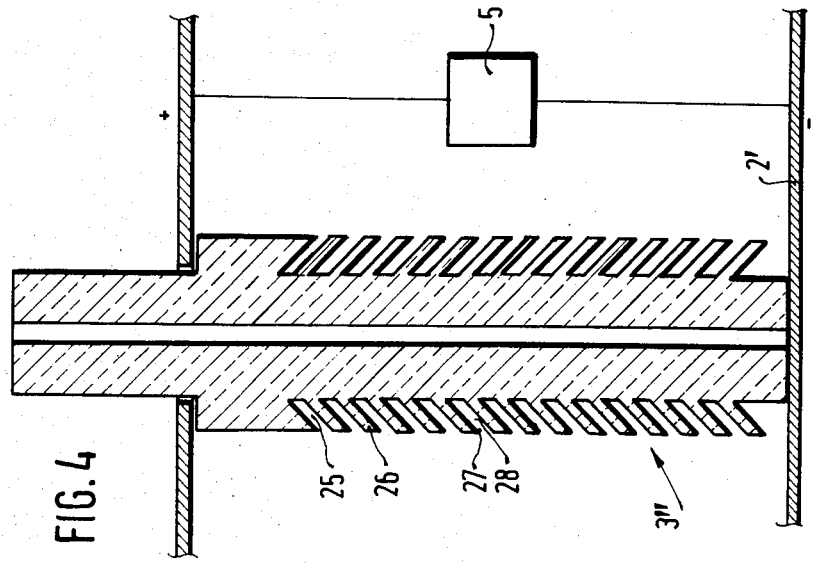
FIG. 4 is a longitudinal sectional view of a third exemplary embodiment of a high-voltage insulator.

A third embodiment is shown in FIG. 4. Here the high-voltage insulator 3″ is also columnar in form, and it has recesses 25 on its surface, which between them form annular shields 26 inclined in a chevron-like fashion. The outermost diameter of the shields in each case forms a sharply defined annular edge 27; the shortest distance between an edge 27 and the next shield in sequence is located on the flank 28 of this shield 26 such that a discharge can take place between the edge 27 and the flank 28, with a thermally hot base point on the flank. By means of such arc discharges, the soot deposited on the flanks of the shields 26 is likewise burned off; this process is particularly effective if the electrode 2′ has negative polarity, because in that case the hot arc base point toward the cathode side terminates on the shoulder.

The annular embodied ribs and recesses in the above exemplary embodiments may also be realized in the form of a continuous spiral rib with the root area between the spiral performing a similar function to that of the recess 16 described with regard to FIG. 1.

The ribs in the exemplary embodiments of FIGS. 1 and 3 can also be inclined in roof-like fashion.

The insulators described may be used both as pure supporting insulators or for supporting insulators having a voltage supply to electrode 2 or 2′. During operation, the insulators have only a slight power loss, because the cleaning mechanism is self-regulating in nature. Very thick soot layers on the insulator initially cause a high power loss, but at the same time this is associated with an intense cleaning effect at the burn-off point. The conduction resistances, however, increase rapidly as a result, which in turn causes a rapid decrease in the initially high power loss. The insulator is thus particularly suitable for high-voltage systems which carry exhaust gases contaminated with soot and which depend for their source of energy on internal combustion engines used to drive motor vehicles.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An electrical insulator having improved soot deposition burn-off characteristics, comprising a columnar body provided with an exterior surface having a series of substantially equally spaced offstanding ribs spaced along the length thereof and including upper and lower parallel surfaces, an adjoining insulator part axially arranged between each of said ribs and having a radial circumference less than that of each of said ribs, one of said parallel surfaces of each of said ribs having an inwardly extending reentrant portion forming an associated recess disposed at an innermost extremity of said parallel surface, each said recess having first and second opposed walls forming an annular area immediately adjacent only one side of each of said ribs, said first wall of each said recess being coplanar with said parallel surface and said second opposed wall of each said recess defining with said insulator a sharp outer edge, each said sharp outer edge being arranged to limit a discharge path across each associated said recess and each associated said rib, said adjoining insulator part being disposed axially adjacent said sharp outer edge of each said recess and including an uninterrupted extent terminating in an adjacent rib, said insulator being disposed between adjacent potential surfaces, and each said sharp outer edge is disposed on the side of said associated rib oriented toward a cathode and one parallel surface of each said rib defines a discharge path on the side oriented toward an anode, whereby at least that portion of said insulator lying beneath each said discharge path is maintained virtually free of soot contaminants.

2. An electrical insulator as defined by claim 1, wherein said insulator has an axial bore arranged to receive a metallic conductor.

3. An electrical insulator as defined by claim 1, wherein said insulator has supporting shoulder means for abutting relation with said cathode.

* * * * *